3,002,856
MIRROR

Konrad H. Marcus and John Fenlon Donnelly, Holland, Mich., assignors to Donnelly Mirrors, Inc., Holland, Mich., a corporation of Michigan
No Drawing. Filed Oct. 22, 1958, Ser. No. 768,833
5 Claims. (Cl. 117—124)

This invention relates to mirrors. More particularly, it relates to soil resistant, glass mirrors and to a process for obtaining the same.

Glass mirrors, particularly those in household use, have heretofore presented a serious cleaning problem. Dust, dirt and condensable and sublimable materials in the air seem to have an affinity for the faces of glass mirrors and to collect thereon to form a tenaciously adherent film of soil. This film clouds the mirror and is, therefore, quite noticeable. Consequently, frequent cleaning of glass mirrors has been a practical necessity where good housekeeping is practiced.

Such cleaning, moreover, is quite difficult, considerable manual effort being required to obtain a streak and spot free, clear, bright mirror face. This is true even when specially developed cleaning compositions have been used.

An object of this invention, therefore, is to provide a glass mirror which is resistant to the formation of soil films on the face thereof.

Another object of this invention is to provide a process for treating the face of a conventional glass mirror to render the same soil resistant.

These and other objects which may appear as this specification proceeds are achieved by this invention which, in summary, comprises soil resistant mirrors and a process for treating mirrors to render the same soil resistant.

A simplified flow diagram of the process hereinafter described in detail is as follows:

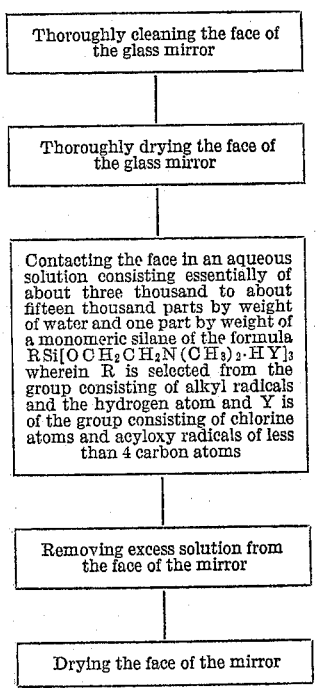

The process of this invention comprises: contacting a substantially air dry and preferably thoroughly clean face of a glass mirror with an aqueous solution consisting essentially of about three thousand to about fifteen thousand parts by weight of water and one part by weight of a monomeric silane of the general formula $$RSi[OCH_2CH_2N(CH_3)_2 \cdot HY]_3$$

wherein R is selected from the group consisting of alkyl radicals and the hydrogen atom and Y is of the group consisting of chlorine atoms and acyloxy radicals of less than 4 carbon atoms; removing excess solution from said face, and thereafter drying said surface.

The face of the mirror to be improved by this invention should be substantially air dry and preferably thoroughly clean before contacting the same with the aqueous solution of this invention. If not clean, the glass surface after treatment in accordance with this invention will appear to be soiled and adherence of the silane of this invention to the surface will be weak. If not at least substantially air dry, the glass surface will comprise areas of aqueous solution diluted to such an extent that incomplete and non-uniform treatment of the glass surface will occur.

The monomeric silanes conforming to the formula are water soluble compounds which can be prepared by reacting silanes of the formula $RSiY_3$ in which R and Y are as defined above, with 2-dimethyl aminoethanol in the presence of a low boiling organic solvent such as, for example, methylene chloride, which is easily removed after the reaction is complete.

For the purpose of this invention the alkyl radicals in the group from which R is selected may be methyl, ethyl, butyl, isopropyl, decyl, octadecyl, and higher alkyl radicals of the formula $C_nH_{2n+1}$ wherein $n$ is an integer from 18 to 38 inclusive, e.g. those derived from paraffin wax, mineral oils and petrolatum.

The aqueous solution can be prepared merely by dissolving the silane conforming to the formula in water. In general, for each part by weight of silane in the solution, the water concentration should be in the range from about three thousand parts by weight to about fifteen thousand parts by weight. Below about three thousand parts by weight of water an undesirable greasy film appears on the face of the mirror treated with the solution. Above about fifteen thousand parts by weight of water, the face of the mirror is incompletely treated when contacted with the solution. Optimum results are obtained when the water concentration is in the range from about five thousand parts by weight to about ten thousand parts by weight per part by weight of the silane.

The face of the mirror to be treated is contacted by the solution preferably by spraying the same thereon. The solution may also be brushed on over the face.

Once the solution has contacted the mirror face, the proper amount of silane apparently adheres tenaciously to the glass surface leaving any excess non-adhering. If the excess is not removed, however, it will result in an undesirable, noticeable film which is difficult to remove after the surface treatment has been concluded. Accordingly, the excess must be removed as soon as possible after the solution has been applied to the mirror face. This is preferably accomplished by rinsing the treated surface with warm water.

The final step of the process comprises drying the treated surface. Preferably, the surface is air dried. An elevated temperature of the drying air may be used to accelerate the drying time. In this regard, it should be noted that the soil resistant properties of the treated mirror face appear to be destroyed when a temperature of 500° F. is reached. However, air drying at a temperature of 300° F. for a period of 20 to 30 minutes is quite satisfactory.

After the treated surface has been dried, it is important that the surface not be touched for a period of at least about 24 hours. Otherwise, the desired properties of the treated surface are not fully obtained.

Mirror faces treated by the process of this invention are soil resistant and stay cleaner longer than untreated mirrors. In addition, it has been found that such mirrors are brighter, are easier to clean—no cleaning comcompounds are needed, only a clean damp cloth—and are smoother than ordinary glass, which means less drag on the cleaning cloth. Moreover, the mirrors of this invention have improved properties under fogging conditions such as might be encountered, for example, in a bathroom. Thus, when the relative humidity of the atmosphere is high and the dew point temperature is reached at the face of the mirrors of this invention, the condensation of water vapor (formation of fog) on the treated surface appears to be much slower, the condensed moisture runs off more easily and the mirror face dries with virtually no water spotting. Indeed, there usually is no need to wipe off a mirror of this invention in a bathroom after a shower has been taken therein.

It is not known exactly what phenomenon is involved in this process. Consequently, no explanation of the principles involved is offered herein. In any event, the mirrors of this invention are a vast improvement over the mirrors prior to this invention and represent a major advance in the art.

Various features and advantages of this invention will be apparent from the following examples which are set forth by way of illustration and not of restriction.

*Example 1*

The first example illustrates the preparation of a silane of this invention.

A solution of 89 g. of 2-dimethylaminoethanol in 100 g. of methylene chloride was added dropwise to a solution of 129.2 g. of octadecyltrichlorosilane in 200 g. of methylene chloride. During addition of the amine solution a precipitate formed so 400 additional grams of methylene chloride were added. After addition of the amine was complete the precipitated product was dissolved in t-butanol, the methylene chloride was removed by evaporation and enough t-butanol was added to give a 20% by weight solution of the salt:

$$C_{18}H_{37}Si[OCH_2CH_2N(CH_3)_2 \cdot HCl]_3$$

*Example 2*

This example illustrates the process of the invention and the soil resistant properties of a mirror face treated by the process.

A plate glass mirror, measuring 36 inches by 48 inches, prepared in a normal manner and given a normal cleaning was divided into two sections, each measuring 36 inches by 24 inches, by drawing a line through the center of the face. One section was cleaned with brushes and a cleaning compound, rinsed off with water and then air dried for approximately 30 seconds at room temperature.

To one part by weight of a solution corresponding to that of Example 1 was added one thousand parts by weight of tap water. The resulting solution, consisting essentially of one part by weight of silane to about five thousand parts by weight of water, was sprayed on the specially cleaned section of the mirror. This section was then rinsed with warm tap water and then air dried in a warm air oven at 300° F. for 20 minutes. The mirror was then kept in the oven for 24 hours at room temperature.

Thereafter, the mirror was removed from the oven and left exposed in a laboratory in which the atmosphere from time to time contained substantial concentrations of fumes such as, for example, oil fumes, salt vapors and acid fumes. After six months exposure, the untreated section of the mirror face was so soiled that it was difficult to see the observer's image in it. In contrast, the treated section of the mirror was in a very clean condition and there was no difficulty in seeing the observer's image in it.

*Example 3*

Another mirror measuring 36 inches by 48 inches was prepared for treatment with an aqueous solution of this invention in the same manner as in Example 2.

To one part by weight of a solution corresponding to that of Example 1 was added two thousand parts by weight of tap water. The resulting solution, consisting essentially of one part by weight of silane to about ten thousand parts by weight of water, was sprayed on the specially cleaned section of the mirror. This section was likewise rinsed with warm tap water, air dried in a warm air oven at 300° F. for 20 minutes and then kept in the oven for 24 hours at room temperature.

Thereafter, the mirror was removed from the oven and placed in a factory washroom comprising a vented gas water heater and in which the usual washing and smoking took place. After two days exposure a greasy film was observed on the untreated section of the mirror while the treated section was observed to be still clean. After a week of exposure, inspection of the mirror from a position directly in front of it showed no marked differentiation, but when viewed from an angle, the untreated section of the mirror face was very definitely clouded, which was worse than the greasy appearance of the first observation. The treated portion was still quite clear. After a month of exposure the soiled character of the untreated section of the mirror face was very apparent not only from an angle, but also from a position directly in front of the mirror while the treated section was relatively and strikingly clean.

Similar results have been obtained with household mirrors which have been taken from homes, treated in accordance with this invention and reinstalled in the same places. Mirrors which had previously required weekly cleaning can now go a month without cleaning. Mirrors which had required daily cleaning need not now be cleaned more than once a week.

We claim:

1. A process for treating a glass mirror to render the face thereof soil resistant, which comprises: contacting said face in substantially air dry, clean condition with an aqueous solution consisting essentially of about three thousand to about fifteen thousand parts by weight of water and one part by weight of a monomeric silane of the formula $RSi[OCH_2CH_2N(CH_3)_2 \cdot HY]_3$ wherein R is selected from the group consisting of alkyl radicals and the hydrogen atom and Y is of the group consisting of chlorine atoms and acyloxy radicals of less than 4 carbon atoms; removing excess solution from said face; and thereafter drying said face.

2. A process for treating a glass mirror to render the face thereof soil resistant, which comprises: contacting said face in substantially air dry, clean condition with an aqueous solution consisting essentially of about three thousand to about fifteen thousand parts by weight of water and one part by weight of a monomeric silane of the formula $RSi[OCH_2CH_2N(CH_3)_2 \cdot HY]_3$ wherein R is selected from the group consisting of alkyl radicals and the hydrogen atom and Y is of the group consisting of chlorine atoms and acyloxy radicals of less than 4 carbon atoms; rinsing said face with warm water; and thereafter drying said face.

3. A process according to claim 2 wherein the water concentration of said aqueous solution is in a range from about five thousand to about ten thousand parts by weight.

4. A process according to claim 2 wherein said monomeric silane is of the formula $$C_{18}H_{37}Si[OCH_2CH_2N(CH_3)_2 \cdot HCl]_3.$$

5. A process for treating a glass surface to render the same soil resistant, which comprises: cleaning said surface; air drying said surface to a substantially liquid-free condition; contacting said surface with an aqueous solution consisting essentially of about three thousand to about fifteen thousand parts by weight of water and one part by weight of a monomeric silane of the formula $RSi[OCH_2CH_2N(CH_3)_2 \cdot HY]_3$ wherein R is selected from the group consisting of alkyl radicals and the hydrogen atom and Y is of the group consisting of chlorine atoms and acyloxy radicals of less than 4 carbon atoms; removing excess solution from said face; and thereafter drying said face.

References Cited in the file of this patent

UNITED STATES PATENTS

| | | |
|---|---|---|
| 2,292,097 | Vollmer | Aug. 4, 1942 |
| 2,306,222 | Patnode | Dec. 22, 1942 |
| 2,383,469 | Colbert et al. | Aug. 28, 1945 |
| 2,445,572 | Gerould et al. | July 20, 1948 |
| 2,478,817 | Gaiser | Aug. 9, 1949 |
| 2,612,458 | Stedman et al. | Sept. 30, 1952 |
| 2,788,295 | Cooke | Apr. 9, 1957 |
| 2,814,572 | Frye | Nov. 26, 1957 |